Sept. 14, 1948.  F. LYIJYNEN  2,449,133
PRESS
Filed April 28, 1945  2 Sheets-Sheet 1
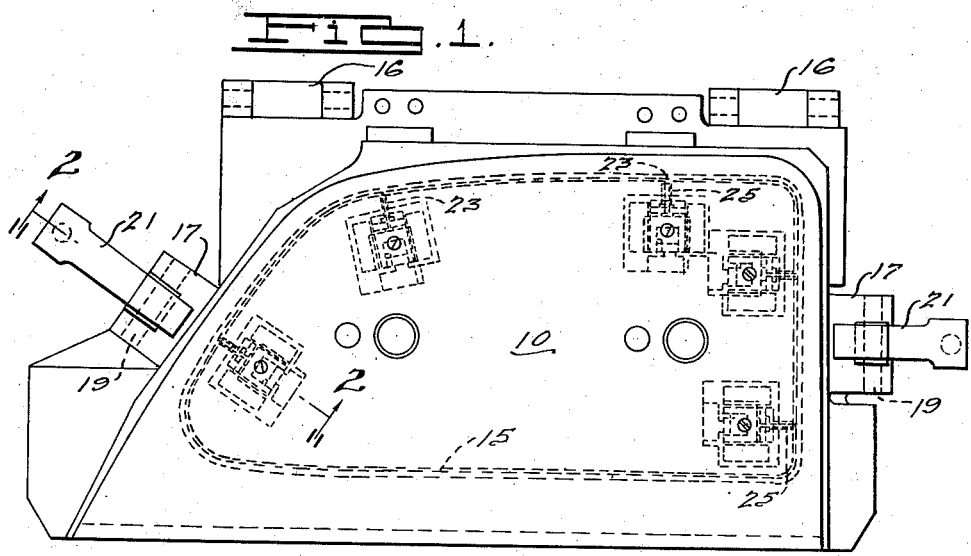
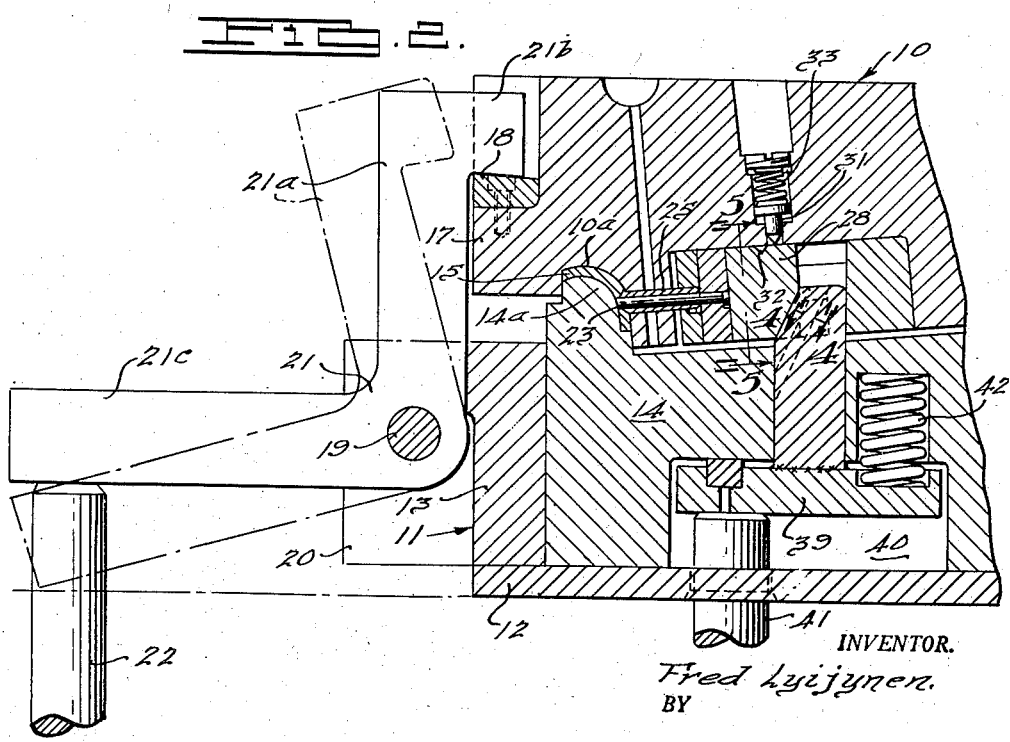
INVENTOR.
Fred Lyijynen.
BY
Gray + Smith
ATTORNEYS.

Sept. 14, 1948.  F. LYIJYNEN  2,449,133
PRESS
Filed April 28, 1945  2 Sheets-Sheet 2
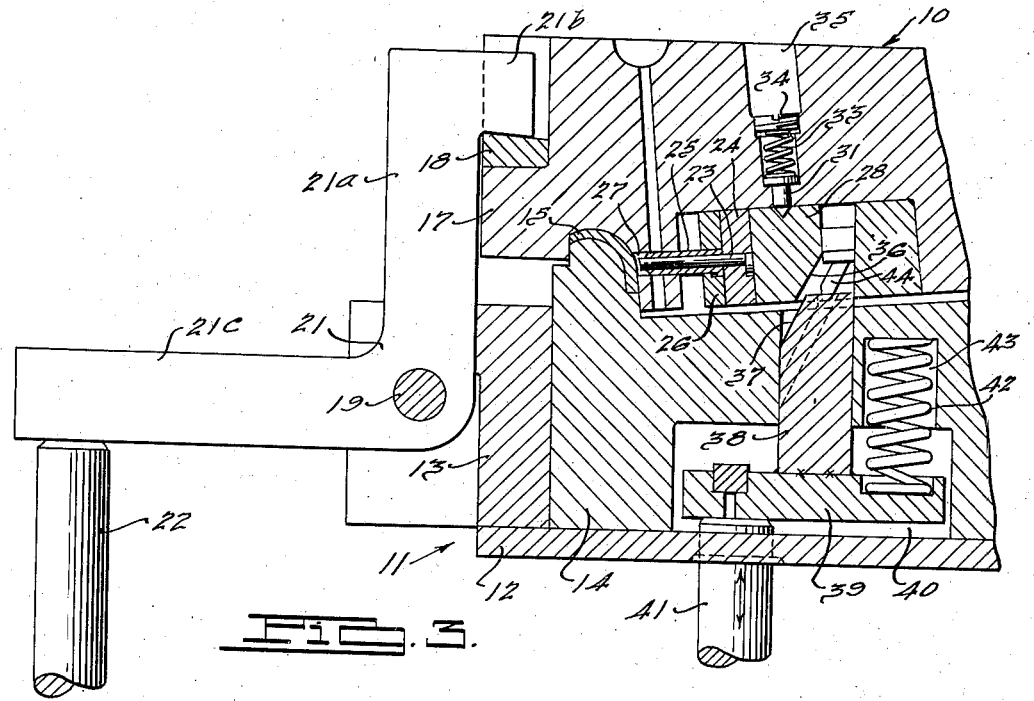
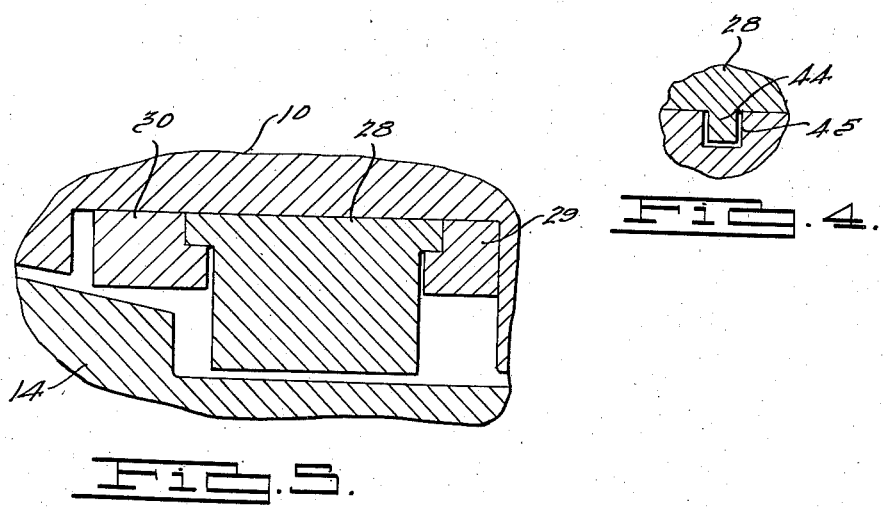
INVENTOR.
Fred Lyijynen.
BY
Gray + Smith
ATTORNEYS.

Patented Sept. 14, 1948

2,449,133

UNITED STATES PATENT OFFICE 2,449,133

PRESS

Fred Lyijynen, Detroit, Mich., assignor to Briggs Manufacturing Company, Detroit, Mich., a corporation of Michigan Application April 28, 1945, Serial No. 590,795

5 Claims. (Cl. 18—42)

1

This invention relates to apparatus for molding or forming plastic articles and more particularly to the manufacture of such articles from plastic materials, such as reactive thermoplastic or thermosetting resinous compositions or substances, which are molded or formed under pressure and usually carried to a final stage of reaction or polymerization by the application of heat.

According to conventional practice plastic articles produced from materials of the above type are formed between heated die or mold members, the charge of plastic material usually being placed in the lower die member of a press after which the upper ram of the press is caused to descend to close the upper and lower die members and subject the charge to pressure and heat. In the manufacture of such plastic articles it is frequently necessary to provide holes, openings, slots or other apertures in the article such, for example, as holes to receive fastening devices. An article subject to this requirement is illustrated, by way of example, in the drawings, namely, a garnish molding for an automobile body. Such molding requires the provision of a number of holes in the side walls thereof for the reception of screws to attach the molding in place around the window reveal of the vehicle body. Heretofore, such holes were punched or pierced in the article after completion of the molding or forming operation and after removal of the article from the dies or mold. This operation resulted in producing holes having ragged or fractured edges with projecting burrs necessitating a finishing operation for the removal of the burrs which proved insufficient to correct the defects. As a result the appearance of the article was considerably impaired due to the inability to produce clean-cut holes or apertures in the article using the above method.

An object of the present invention is to overcome the foregoing disadvantages and eliminate the above mentioned defects, this being accomplished by piercing or forming the holes or apertures in the article during the molding operation and while the plastic material is in the reactive stage. Accordingly, after the mold is closed and while the material is still in moldable condition, i. e. while the reaction or polymerization of the material progresses, the desired holes or apertures are pierced in the article and the punches or other tools employed for this purpose remain in operative positions in the body of the article and are preferably not withdrawn until the material has set or attained a permanent shape or has reached a reacted stage permitting withdrawal of the punches without impairing the accuracy of the holes.

A further object of the invention is to provide an improved apparatus embodying mechanism for punching or piercing holes, apertures or the like in a plastic article during the molding operation, such as while the material is being formed under heat and pressure in a closed mold.

Still another object of the invention is to provide a mold for forming plastic material having means for punching or piercing one or more holes or apertures in the article during the formation thereof and while the mold is closed or substantially so.

Other objects of this invention will appear in the following description and appended claims, reference being had to the accompanying drawings forming a part of this specification wherein like reference characters designate corresponding parts in the several views.

Fig. 1 is a plan view of a mold unit constructed in accordance with one embodiment of the present invention.

Fig. 2 is an enlarged section taken substantially through lines 2—2 of Fig. 1 looking in the direction of the arrows, the punch mechanism in this view being shown in operative position.

Fig. 3 is a view similar to Fig. 2 illustrating the punch mechanism in retracted position.

Fig. 4 is an enlarged section taken substantially through lines 4—4 of Fig. 2 looking in the direction of the arrows.

Fig. 5 is an enlarged section taken substantially through lines 5—5 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one of a series of self-contained transitory mold units which are adapted to be introduced in succession into a press, preferably of the hydraulic type, for the purpose of forming in each mold unit a desired article from a charge of plastic material introduced into the mold unit before the latter is fed into the press. Each mold unit comprises upper and lower mold or die members which receive the plastic charge therebetween and which, in accordance with the illustrated embodiment of the invention, are provided at opposite sides with devices for locking or clamping the mold members of the unit tightly together so as to permit the mold unit to be withdrawn from the press in order to complete the reaction or polymerization of the plastic material outside the press. In accordance with the preferred method the mold units are fed in succession into and out of the press and each unit remains in the press for a short interval of time during which the preliminary pressing and heating of the plastic material to moldable temperature and the piercing of holes or apertures in the article are carried out. It is usually desirable, while the mold unit is in the press, to relieve the mold from the pressure of the ram for a short interval of time so as to permit breathing or escape of the gases after which final pressure is applied by the ram so as to fully close the mold and enable it to be clamped tightly in closed position for withdrawal from the press after the article has been fully formed and the holes pierced therein. When the mold unit is withdrawn from the press the final polymerization or reaction of the plastic material is allowed to proceed to the final stage and during this time the press is freed for operation upon a succeeding mold unit which may be introduced into the press as soon as the preceding unit has been withdrawn therefrom.

As illustrated in the drawings, the mold unit comprises upper and lower mold or die members 10 and 11 between which the plastic charge is received. The lower mold member comprises a base plate 12 and surrounding upright side plates 13 rigidly secured together and adapted to receive and support the lower die or mold 14. When the mold unit is introduced into the press it will be understood that the base plate 12 rests upon the lower heated platen of the press and is suitably positioned thereon. The mold or die members 10 and 14 are suitably formed with die portions 10a and 14a which cooperate together to form the article 15 which in the present instance is in the form of a garnish molding adapted to be secured in position within the window opening of an automobile body. The upper and lower mold members are hinged together at 16 along corresponding edges thereof, as shown in Fig. 1, so as to permit the upper member 10 of the mold unit to be swung upwardly in order to charge the mold or remove the finished article therefrom. The mold unit is preferably used in conjunction with any conventional type of hydraulic press having a vertically reciprocating ram carrying at its lower end a heated platen engageable with the mold member 10 and adapted to maintain the same at the proper temperature for molding the charge of plastic material. Since the lower heated platen upon which the bottom plate 12 of the mold unit rests is usually fixed to the bed of the press, it will be understood that upon descent of the ram of the press the plastic charge will be compressed between the upper and lower mold or die members 10 and 14.

The upper pressure plate or die member 10 is formed at opposite sides with projecting ledges 17 upon the upper surface of each of which is secured a wedge shaped hardened piece 18. Pivotally mounted at each side of the mold unit upon a pivot pin 19 secured within a bifurcated extension 20 of the lower mold frame 13 is a swinging locking dog or clamping member 21 which is in the form of a bell crank lever having a vertical projecting arm 21a terminating in a hook portion 21b tapered at its underside for cooperation with the tapered surface of the hardened piece 18. The lever 21 has a laterally projecting arm 21c positioned for engagement by a vertically shiftable pneumatically operated plunger 22 suitably mounted within the base or bed of the press. This plunger is secured to the reciprocable piston of any conventional air cylinder mechanism suitably controlled by the operator of the press.

In accordance with the present invention means is provided for piercing or forming a number of holes or apertures, such as five, in the garnish molding 15 during the molding operation and while the plastic material is in the reactive stage. Each hole in the present instance is formed by similar mechanism and, hence, the description of one will suffice for all. A punch 23 is anchored at one end within a hole in a supporting plate 24 and extends through the bore of a counter-sink punch or tool 25 which is anchored within a supporting plate 26. The punch elements 23 and 25 project freely through a hole 27 in the die or mold 10 in position to engage the outer wall of the garnish molding 15, as clearly illustrated in Fig. 3. The punch supporting plates 24 and 26 are secured together and to a slide 28 shiftable within a recess in the die or mold 10. The slide 28 is carried and guided by suitable ways 29 and 30 as illustrated in Fig. 5. The slide 28 is yieldingly held in retracted position by means of a spring pressed safety locking pin or plunger 31 having a tapered lower end engageable within a notch 32 in the slide 28, as illustrated in Fig. 3. The pin 31 is yieldingly urged toward the slide 28 by means of a compression spring 33 held in position within an aperture in the die 10 by means of a screw plug 34 accessible from the top of the die through a hole or aperture 35.

The slide 28 is provided at its rear side with a cam face 36 adapted to be contacted by a correspondingly inclined cam face 37 on a vertically reciprocable cam member 38 secured at its lower end to a cam plate 39 housed within a recess 40 in the lower die 14. The cam plate 39 and the cam 38 may be shifted upwardly within the recess 40 by means of a pneumatically operated plunger 41 suitably mounted within the base or bed of the press and shiftable upwardly through a hole in the base plate 12 of the mold by means of the reciprocable piston of a conventional air cylinder mechanism controlled by the operator of the press. With the punch and cam mechanism in their respective positions shown in Fig. 3 the plunger 41 may be shifted upwardly through the bottom plate 12 of the mold into engagement with the cam plate 39, thus elevating the same as well as the cam 38. As the cam rises the cam surface 37 contacts the cam surface 36 on the slide 28, thereby shifting the slide laterally and forcing the punch elements 23 and 25 into the article 15 in the manner shown in Fig. 2. The center punch 23 projects somewhat beyond the counter-sink punch 25 so as to completely pierce the wall of the article while the punch element 25 enters the article a sufficient distance to counter-sink the outer end of the pierced hole. Retraction of the punch elements from the article is accomplished through the medium of a return spring 42 upon retraction of the pneumatically operated plunger 41. The spring 42 has its lower end anchored within a recess in the cam plate 39 and its upper end housed within a hole or recess 43 in the lower die 14. The slide 28 is provided with a laterally projecting inclined rib 44 projecting within an inclined cam slot 45 in the cam member 38. Thus, when the cam 38 is shifted downwardly by the action of the return spring 42 the cooperating inclined cam surfaces on the rib 44 and cam slot 45 will positively shift the slide 28 and the punch elements outwardly from the operative position shown in Fig. 2 to the retracted position shown in Fig. 3, thus freeing the punch elements from the formed article 15. When the slide reaches its fully retracted position the safety locking pin 31 will be forced into the notch 32, thus yieldingly holding the slide in its retracted position.

The plastic materials, which I use, preferably are composed of one or more thermosetting resins as the principal constituent thereof which may be combined with a suitable reinforcing filler of fibrous nature. Typical thermosetting resins which have been used satisfactorily are the phenol-formaldehyde, urea-formaldehyde and melamine type resins.

Before commencement of the press operation and before the mold unit has been introduced into the press, I prefer to heat the entire mold and bring it up to a predetermined temperature which is substantially maintained within the press by the upper and lower heated platens thereof. The charge for the mold is usually in the form of one or more pieces or pellets preferably contoured or cut to approximately the shape of the bottom mold or die portions 14a so as to permit the piece to be readily inserted into the mold and supported in position when the mold is open. Upon charging the heated mold unit the latter is closed with the dies 10 and 14 in superimposed relation and the charge therebetween. The mold unit is then shifted into the press in proper position with respect to the upper and lower heated platens thereof and the press is closed by descent of the ram. The press remains closed for the proper interval of time to bring the charge into moldable condition and to initiate the shaping or forming of the article. The ram is then raised to relieve the pressure on the mold or die members and permit the escape of gases therefrom. This operation is generally called "breathing" and ordinarily requires but a few seconds, such as four or five seconds. Upon completion of the breathing period the ram of the press descends into engagement with the upper mold member 10 and again exerts pressure on the mold unit while also heating the same to maintain substantially a uniform temperature. As soon as the final pressure is applied to the mold unit after the breathing operation the plunger 41 is shifted upwardly, thereby causing the cam 38 to shift the slide 28 inwardly and force the punch elements into the article 15 in the manner shown in Fig. 2.

Since the plastic material at this time is still in a reactive stage or soft moldable condition, the punch elements will form a clean-cut, countersunk hole in the side wall of the article, this result being aided by the pressure exerted on the material by the die members while the ram holds the mold unit under compression for a suitable interval of time. During the final pressing operation and while the punch elements are embedded in the article the plunger 22 is shifted upwardly to engage the arm 21c of the bell crank lever 21, thereby forcing the hook shaped end 21b thereof over the piece 18. Since the cooperating surfaces of the parts 18 and 21b are tapered or wedge shaped, the force exerted by the plunger 22 will result in a wedging action between these parts tending to draw down the upper and lower die members 10 and 11 tightly together. This action of the clamps 21 ensures the mold being held in tightly closed position. With the mold in this condition and with the punch elements retracted as shown in Fig. 3 and with the plunger 41 moved downwardly out of its position illustrated in Fig. 3, the mold may be withdrawn from the press so as to complete the reaction or polymerization of the plastic material within the mold while it is outside the press. During the period of time necessary to carry the reaction of the material to the final stage while the mold unit is outside the press, it will be understood that the mold unit will remain in locked closed position as shown in Fig. 2. Upon completion of the reaction of the material the clamps 21 may be released and the mold opened in order to remove the finished article therefrom.

The preferred molding apparatus employed in connection with the present invention is more fully illustrated and described in my copending application Serial No. 581,648, filed March 8, 1945.

I claim:

1. Molding mechanism for forming a plastic article, comprising upper and lower mold or die members adapted to receive a plastic charge therebetween, a punch carried by the upper of said members, and a fluid actuated plunger shiftable through the bottom of the lower member for actuating said punch to cause the same to penetrate the article during formation thereof in said members.

2. Molding mechanism for forming a plastic article, comprising upper and lower mold or die members adapted to receive a plastic charge therebetween, a slide carried by the upper of said members, a punch carried by said slide, and cam means in the lower member cooperative with said slide for shifting it to cause said punch to penetrate the article during formation thereof in said members.

3. Molding mechanism for forming a plastic article, comprising upper and lower mold members adapted to be relatively moved in a vertical direction into open and closed positions, a punch, a slide carrying said punch, said slide being mounted in the upper mold member and being shiftable transversely to the direction of the opening and closing of the mold members to cause said punch to penetrate said article, means including a cam carried by the lower mold member and movable in the direction of the opening and closing of the mold members for cooperating with said slide to shift it transversely, and a fluid actuated plunger reciprocable through the lower mold member for moving said cam.

4. Molding mechanism for forming a plastic article, comprising upper and lower mold members adapted to be relatively moved in a vertical direction into open and closed positions, a punch, a slide carrying said punch, said slide being mounted in the upper mold member and being shiftable transversely to the direction of the opening and closing of the mold members to cause said punch to penetrate said article, means including a cam carried by the lower mold member and movable in the direction of the opening and closing of the mold members for cooperating with said slide to shift it transversely, a fluid actuated plunger reciprocable through the lower mold member for moving said cam in an upward direction, and spring means for moving said cam in the opposite direction.

5. Molding mechanism for forming a plastic article, comprising upper and lower mold members adapted to be relatively moved in a vertical direction into open and closed positions, a punch, a slide carrying said punch, said slide being mounted in the upper mold member and being shiftable transversely to the direction of the opening and closing of the mold members to cause said punch to penetrate said article, means including a cam carried by the lower mold member and movable in the direction of the opening and closing of the mold members for cooperating with said slide to shift it transversely, and a fluid actuated plunger reciprocable through the lower mold member for moving said cam, said cam and said slide having an operative connection therebetween adapted to permit separation of the cam and slide when said mold members are opened.

FRED LYIJYNEN.

REFERENCES CITED

The following references are of record in the file of this patent:

UNITED STATES PATENTS

| Number | Name | Date |
|---|---|---|
| 1,935,794 | Geyer | Nov. 21, 1933 |
| 1,958,422 | Dinzl | May 15, 1934 |
| 2,027,165 | Grubman | Jan. 7, 1936 |
| 2,124,529 | Lester et al. | July 26, 1938 |
| 2,124,733 | Decker | July 26, 1938 |
| 2,151,131 | McWane | Mar. 21, 1939 |
| 2,201,777 | Kliesrath | May 21, 1940 |
| 2,214,638 | Kux | Sept. 10, 1940 |
| 2,325,687 | Kux | Aug. 3, 1943 |
| 2,358,962 | Cunningham | Sept. 26, 1944 |
| 2,371,061 | Milano | Mar. 6, 1945 |